United States Patent [19]

Snyder

[11] Patent Number: 4,512,304
[45] Date of Patent: Apr. 23, 1985

[54] METHOD AND APPARATUS FOR CONTROLLING AIR TO GAS RATIO IN GAS ENGINES

[75] Inventor: Warren E. Snyder, Dousman, Wis.

[73] Assignee: Dresser Industries, Inc., Dallas, Tex.

[21] Appl. No.: 543,722

[22] Filed: Oct. 20, 1983

[51] Int. Cl.³ .............................................. F02M 7/00
[52] U.S. Cl. ................................... 123/344; 123/440; 123/389; 123/391
[58] Field of Search ............... 123/527, 440, 389, 391, 123/378, 344

[56] References Cited

U.S. PATENT DOCUMENTS

| | | | |
|---|---|---|---|
| 4,102,313 | 7/1978 | Laprade et al. | 123/440 |
| 4,137,876 | 2/1979 | Volpe | 123/589 |
| 4,294,214 | 10/1981 | Treible | 123/440 |
| 4,364,364 | 12/1982 | Subramaniam | 123/527 |

FOREIGN PATENT DOCUMENTS 2144886  3/1973  Fed. Rep. of Germany ...... 123/389

*Primary Examiner*—E. Rollins Cross
*Attorney, Agent, or Firm*—Roy Van Winkle; John N. Hazelwood

[57] ABSTRACT

Apparatus for controlling the air to gas ratio of fuel being supplied to a gas engine that utilizes the pressure in the inlet of the carburetor and the pressure in the intake manifold of the engine to control a regulator that is used to supply gas to the engine. The control mechanism is responsive to a signal from an intelligence source, such as an exhaust gas sensor, for varying the air to gas ratio to a preset or desired air to gas ratio. A method for controlling the air to gas ratio of fuel being supplied to a gas engine wherein an engine function is sensed and a signal generated representative of the function. The signal is compared with a reference signal and a resultant signal is generated. Pressure is then generated that is representative of the resultant signal and the pressure is applied to the regulator to cause a predetermined rate of flow of gas to the carburetor, thereby controlling the air to gas fuel ratio to the engine.

10 Claims, 4 Drawing Figures

METHOD AND APPARATUS FOR CONTROLLING AIR TO GAS RATIO IN GAS ENGINES

BACKGROUND OF THE INVENTION

This invention relates generally to apparatus and methods for controlling the air to gas ratio of fuel being supplied to gas (gaseous fueled) engines. More specifically, this invention relates to an improved apparatus and method for controlling the air to gas ratio of fuel being supplied to a gas engine wherein the regulator controlling the gas flow to the carburetor is actuated by a pressure which varies between the pressure in the intake to the carburetor and the pressure in the intake manifold of the engine.

Carburated gas engines normally use at least one pressure regulator in the gas line to produce a controlled pressure at the carburetor. The conventional regulator has a diaphragm that produces a force balance between air pressure plus an adjustable spring force on one side and the regulated gas pressure on the other. If the air pressure plus the adjustable spring force exceeds the regulated gas pressure, the valve open and the gas pressure increases. If the regulated gas pressure exceeds the air pressure plus the adjustable spring force, the valve closes and the gas pressure decreases.

The aforedescribed regulator provides a regulated pressure of gas to the carburetor in which the air fuel ratio is presumably controlled. Relatively small changes in ambient conditions, however can cause the air fuel ratio to change and hence cause the engine to operate less efficiently. For example, changes in ambient temperature, humidity, engine temperature and fuel BTU content can all affect the efficiency.

At the present time, high operating efficiencies for the engine are very desirable and the high operating efficiencies are not available with the regulators utilized previously. Accordingly, it is an object of this invention to provide a simple method and apparatus for controlling the air to gas ratio in gas engines that utilize the commercially available regulators, but, provide better efficiencies than in engines operating with standard regulator systems.

SUMMARY OF THE INVENTION

This invention provides in one aspect, improved apparatus for controlling the air to gas ratio of the fuel mixture being supplied to a gas engine that includes intake and exhaust manifolds connected to the engine, a carburetor having an air inlet and having an outlet connected to the intake manifold, and a gas regulator connected to the carburetor for controlling the pressure of gas to the carburetor. The improved apparatus comprises a conduit connecting the air inlet with the intake manifold and an actuator located in the conduit that is connected to the regulator. The actuator provides an output pressure signal to the regulator of a magnitude between the pressure in the inlet and the pressure in the intake manifold, thus causing the regulator to supply the desired rate of flow of gas to the carburetor. The apparatus also includes intelligence means connected to the actuator for transmitting signal to the actuator whereby the actuator causes the regulator to provide the desired rate of flow of gas to the carburetor and, consequently, the desired air to gas ratio of fuel mixture supplied to the engine.

In another aspect, this invention provides an improved method for controlling the air to gas flow ratio being supplied to a gas engine that includes intake and exhaust manifolds, a carburetor having an air inlet and having an outlet connected to the intake manifold, and a gas regulator connected to the carburetor for controlling the rate of flow of gas to the carburetor. The improved method comprises the steps of sensing an engine function, generating a signal representative of the function, comparing the signal with a reference signal, generating a resultant signal representative to the result of comparing the signals, generating a pressure representative of the resultant signal, and applying the pressure to the regulator causing a predetermined rate of flow of gas to the carburetor and thereby controlling the air to gas ratio of fuel mixture to the engine.

BRIEF DESCRIPTION OF THE DRAWING

The foregoing and additional objects and advantages will become more apparent as the following detailed description is read in conjunction with the accompanying drawing, wherein like reference characters denote like parts in all views, and wherein.

DETAILED DESCRIPTION OF THE PREFERRED EMBODIMENT

Figure 1:
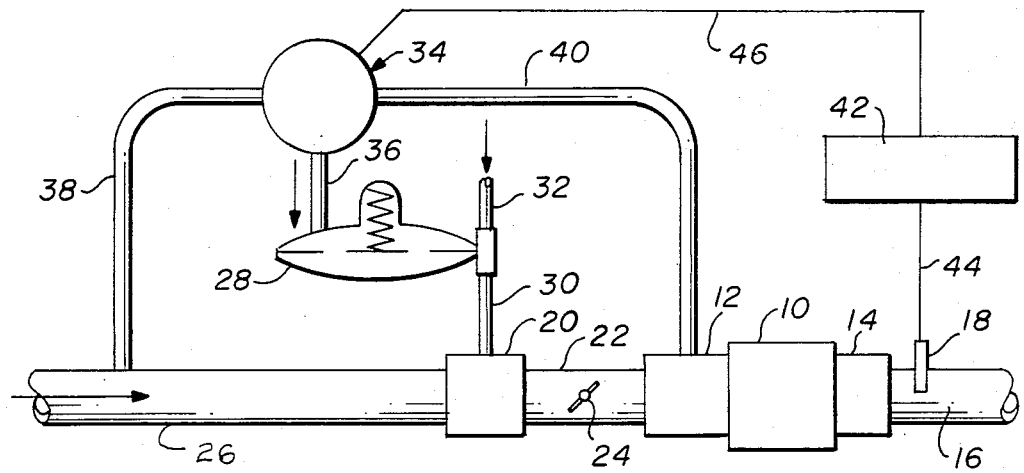
FIG. 1 is a schematic drawing illustrating apparatus constructed in accordance with the invention.

Referring to the drawing and to FIG. 1 in particular, shown therein is a gas engine 10 that has an intake manifold 12 and exhuast manifold 14 connected thereto. Extending outwardly from the exhaust manifold 14 is an exhaust pipe 16 in which there is mounted an engine function sensor 18. The sensor 18 may desirably be sensing the ratio of air to fuel for the engine 10 compared to stoichiometric. The precise function is not critical so long as air fuel ratio can be determined therefrom.

A carburetor 20 is connected to the intake manifold by conduit 22 having a throttle valve 24 mounted therein. Extending outwardly from the carburetor 20 is an air inlet 26 which will usually include a filter (not shown) and may include a turbocharger (not shown).

A regulator 28, which is of the conventional diaphragm type, is arranged to supply gas to the carburetor through a conduit 30. A conduit 32 extends from the regulator to a source of gas (not shown).

An actuator 34, which will be described more fully hereinafter, consists of several components. The actuator 34 is connected with the regulator 28 by a conduit 36, with the inlet 26 to the carburetor 20 by a conduit 38, and with the intake manifold by a conduit 40.

Operably disposed between the sensor 18 and the actuator 34 is intelligence apparatus 42 which in the preferred form, is an electronic system arranged to receive a signal from the sensor 18 and to compare that signal with a reference previously inserted into the apparatus 42. The system 42 is capable of generating an output signal related to the results of the comparison between the signal from the sensor 18 and the reference. The signal from the sensor 18 is transmitted to the intelligence apparatus 42 by an electrical circuit 44 and from the apparatus 42 to the actuator 34 via an electric circuit 46.

Figure 2:
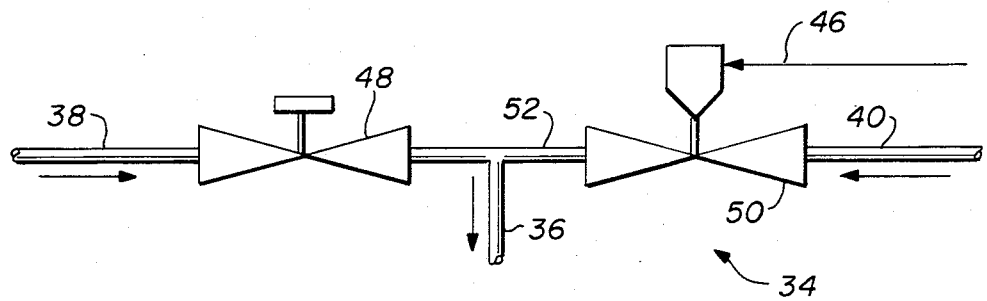
FIG. 2 is a schematic of one type of pressure control utilized in the invention illustrated in FIG. 1.

The actuator 34 as previously mentioned, includes several components. A more detailed schematic of the actuator 34 is shown in FIG. 2.

As illustrated therein, the actuator 34 includes a manual valve or fixed orifice 48 that is connected to the conduit 38 that extends to the inlet 26. A variable or control valve 50 is connected to the valve 48 by a conduit 52 and has its opposite end connected to the intake manifold 12 by the conduit 40. The control signal from the intelligence apparatus 42 is transmitted to the control valve 50 through electrical circuit 46. The actuator 34, as illustrated in FIG. 2, is connected to the regulator 28 by the conduit 36 which has its opposite end connected to the conduit 52 between the valves 48 and 50.

Figure 3:
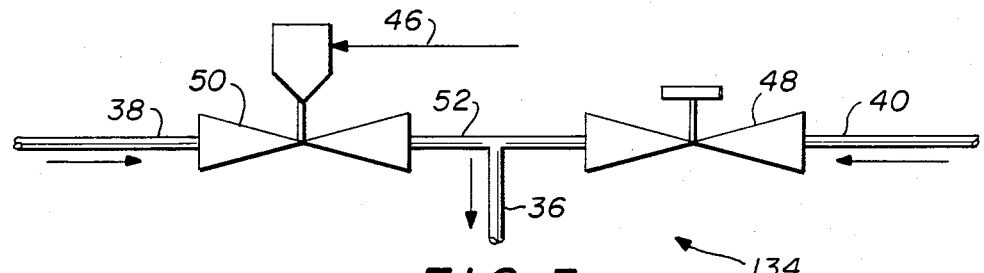
FIG. 3 is another schematic diagram illustrating another embodiment of control device that is utilized in the invention illustrated in FIG. 1; and, FIG. 4 is still another embodiment of control device that can be utilized in the invention illustrated in FIG. 1.

FIG. 3 illustates another modification of the actuator that can be utilized in the system illustrated in FIG. 1. As shown in FIG. 3, the actuator is designated generally by the reference character 134. The same reference characters will be utilized on the same parts as previously described in connection with FIG. 2.

As shown therein, the positions of the control valve 50 and the manual valve or fixed orifice 48 have been reversed. In other words, the control valve 50 is connected to the conduit 38 that is connected to the inlet 26 of the carburetor 20. The valve 48 is connected by the conduit 40 with the intake manifold 12. As previously described, the electrical circuit 46 connects the control valve 50 with the intelligence apparatus 42. In operation, the actuators 34 and 134 will work substantially the same, except in the actuator 134 the inlet pressure will be varied instead of the intake manifold pressure.

Figure 4:
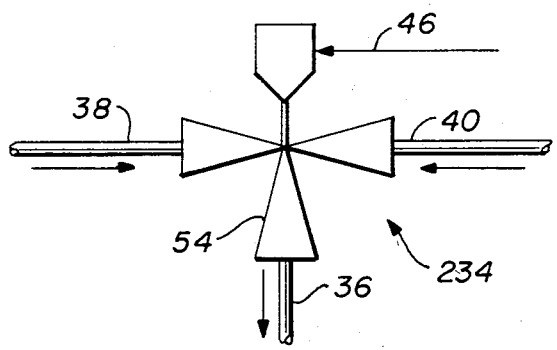

FIG. 4 illustrates still another modification of the actuator that can be utilized in the system illustrated in FIG. 1. The actuator is designated by the reference character 234 and includes a single controlled, three-way valve 54 that has one inlet connected to the conduit 38 which extends to the inlet 26 to the carburetor 20 and a second inlet connected to the conduit 40 that which is connected to the intake manifold 12. The outlet from the valve 54 is connected by the conduit 36 to the regulator 28 as previously described. The controlled three-way valve 54 is connected by the electrical circuit 46 with the intelligence apparatus 42. In this actuator 234, the output in the conduit 36 and the valve 54 will be of a magnitude between the pressure in the conduit 38 and the pressure in the conduit 40 in accordance with the signal reaching the valve 54.

With the engine 10 operating, it can be seen that the pressure in the inlet 26 and in the conduit 38 will be different from the pressure in the intake manifold 12 and in the conduit 40. Thus, the actuator 34 is exposed to a pressure difference thereacross. A sensor 18 senses some engine function, such as, for example, the air fuel ratio as compared to soichiometric and transmits a signal accordingly through the circuit 44 to the intelligence apparatus 42 wherein that signal is compared with a standard or reference signal. A resultant signal is then transmitted through the electrical circuit 46 to the actuator 34 and the appropriate pressure (somewhere between the pressure in the conduit 38 and the pressure in the conduit 40) is transmitted through the conduit 36 to actuate the regulator 28, either reducing or increasing the quantity of gas flowing through the conduit 30 to the carburetor 20 as appropriate.

As long as the engine 10 is operating at a generally constant speed and load, the throttle valve 24 will remain in a substantially fixed position, and the air to fuel ratio should remain substantially constant until the temperature changes, the fuel quality varies or upon the occurrence of some other factor affecting engine operation. The sensor 18 is sensing the variations in the exhaust manifold and continual comparison is being made to the standard signal in the apparatus 42. A constant update of the air to fuel ratio is being transmitted to the actuator 34 to cause the regulator 28 to supply the desired quantity of gas to the carburetor 20 as needed to maintain the air fuel ratio at the desired value.

Each of the modifications of the actuator 34 is capable of performing this function. The type of intelligence apparatus 42 utilized will of course be strictly up to the user, with it being possible to use one of the number of commercially available systems to perform the comparing function.

It will be understood that the foregoing is presented by way of example only and that many modifications and changes can be made thereto without departing from the spirit and scope of the invention.

The embodiments of the invention in which an exclusive property or privilege is claimed are defined as follows:

1. Improved apparatus for controlling the air to gas ratio of fuel being supplied to a gas engine that includes intake and exhaust manifolds connected to the engine, a carburetor having an air inlet and having an outlet connected to the intake manifold, and a gas regulator connected to the carburetor for controlling the pressure of gas to the carburetor, said improved apparatus comprising:

conduit means connecting the air inlet with the intake manifold;

actuating means located in said conduit means and connected to said regulator, said actuating means providing an output signal to said regulator that has a magnitude equal to or between the pressure in said inlet and the pressure in said intake manifold for actuating said regulator to supply the desired rate of flow of gas to said carburetor; and, intelligence means connected to said regulator actuating means for transmitting a signal to said actuating means whereby said actuating means causes said regulator to provide the desired rate of flow of gas to said carburetor and the desired air to gas ratio of fuel supplied to said engine.

2. The apparatus of claim 1, wherein said actuating means includes:

fixed control means in said conduit means;

a conduit connecting said conduit means with said regulator;

variable control means spaced from said fixed control means and connected to said intelligence means for determining the pressure applied to said regulator through said conduit to control the rate of flow of gas supplied to said carburetor; and said conduit being disposed between said fixed and variable control means.

3. The apparatus of claim 2 wherein said intelligence means includes means for sensing an engine function, comparing said engine function with a reference, and transmitting the resulting signal to said actuating means.

4. The apparatus of claim 2 wherein:

said fixed control means is connected to said intake manifold; and said variable control means is connected to said air inlet.

5. The apparatus of claim 2 wherein:

said fixed control means is connected to said air inlet whereby air inlet pressure is imposed on said fixed control means; and, said variable control means is connected to said intake manifold whereby inlet manifold pressure is imposed thereon.

6. The apparatus of claim 1 wherein said regulator actuating means includes a variable, flow restricting valve having inlets connected to said air inlet and to said intake manifold and having an outlet connected to said regulator, said valve being variable in response to the signal from said intelligence means.

7. An improved method for controlling the air to gas ratio of fuel being supplied to a gas engine that includes intake and exhaust manifolds, a carburetor having an air inlet and having an outlet connected to the intake manifold, and a gas regulator connected to the carburetor for controlling the rate of flow of gas to the carburetor, the improved method comprising the steps of:

sensing an engine function;
generating a signal representative of said function;
comparing said signal with a reference signal;
generating a resultant signal representative of the result of comparing said signals;
generating a pressure by combining intake manifold pressure and inlet air pressure that is representative of said resultant signal; and,
applying said generated pressure to said regulator causing a predetermined rate of flow of gas to said carburetor and thereby, controlling the air to gas ratio of fuel to said engine.

8. The improved method of claim 7 wherein the step of generating a pressure representative of said resultant signal includes combining the intake manifold pressure which has passed through a fixed flow restrictor with the air inlet pressure which has passed through a variable flow restrictor that varies in response to said resultant signal and imposing the combined pressures on said regulator.

9. The improved method of claim 7 wherein the step of generating a pressure representative of said resultant signal includes combining the intake manifold pressure which has passed through a variable flow restrictor that varies in response to said resultant signal with the air inlet pressure which has passed through a fixed flow restrictor and imposing the combined pressure on said regulator.

10. The method of claim 7 wherein the step of generating a pressure representative of said resultant signal includes combining the air inlet and intake manifold pressures in a variable, flow restricting mixing valve that varies in response to said resultant signal and imposing the combined pressures on said regulator.

* * * * *